(12) United States Patent
Boromandi et al.

(10) Patent No.: US 12,337,901 B2
(45) Date of Patent: Jun. 24, 2025

(54) SECURING ASSEMBLY FOR AN INTERCEPTION ELEMENT ON A VEHICLE PILLAR OF A MOTOR VEHICLE BODY, AND MOTOR VEHICLE

(71) Applicant: Bayerische Motoren Werke Aktiengesellschaft, Munich (DE)

(72) Inventors: Farshad Boromandi, Unterhachig (DE); Felix Halang, Dresden (DE); Roland Moch, Munich (DE); Juan De La Fuente, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 300 days.

(21) Appl. No.: 18/011,584

(22) PCT Filed: Jun. 8, 2021

(86) PCT No.: PCT/EP2021/065284
§ 371 (c)(1),
(2) Date: Dec. 20, 2022

(87) PCT Pub. No.: WO2022/008148
PCT Pub. Date: Jan. 13, 2022

(65) Prior Publication Data
US 2023/0286589 A1    Sep. 14, 2023

(30) Foreign Application Priority Data
Jul. 8, 2020  (DE) .................... 10 2020 117 989.8

(51) Int. Cl.
*B62D 25/04* (2006.01)
*B62D 21/15* (2006.01)

(52) U.S. Cl.
CPC ........... *B62D 21/157* (2013.01); *B62D 25/04* (2013.01)

(58) Field of Classification Search
CPC .............................. B62D 25/04; B62D 21/157
(Continued)

(56) References Cited

U.S. PATENT DOCUMENTS 9,868,470 B2    1/2018   Emura
2005/0046233 A1   3/2005   Saeki
(Continued)

FOREIGN PATENT DOCUMENTS

DE   10 2013 224 056 A1   6/2014
JP          6099223 B2 *   3/2017   ............. B62D 25/04
(Continued)

OTHER PUBLICATIONS

JP6099223 Texxt (Year: 2017).*
(Continued)

*Primary Examiner* — Dennis H Pedder
(74) *Attorney, Agent, or Firm* — Crowell & Moring LLP

(57) ABSTRACT

A securing assembly for an interception element on a vehicle pillar of a body for a motor vehicle is provided. The interception element which is secured to the vehicle pillar protrudes outwards from the vehicle pillar in the vehicle transverse direction, so that an upward movement along the vehicle pillar in the vehicle vertical direction, produced by a crash obstacle impacting the vehicle pillar inwards in the vehicle transverse direction, can be at least limited by the interception element.

6 Claims, 3 Drawing Sheets

(58) Field of Classification Search
USPC .......................................... 296/193.06, 187.12
See application file for complete search history.

(56) References Cited

U.S. PATENT DOCUMENTS

| | | |
|---|---|---|
| 2005/0151363 A1 | 7/2005 | Saeki |
| 2009/0140551 A1* | 6/2009 | Stalhammar ........... B62D 25/04 |
| | | 296/193.06 |
| 2020/0207420 A1 | 7/2020 | Murray et al. |

FOREIGN PATENT DOCUMENTS

| | | | | |
|---|---|---|---|---|
| JP | 6485419 B2 * | 3/2019 | ............ | B62D 21/15 |
| KR | 101416052 B1 | 7/2014 | | |
| WO | WO 2015/049949 A1 | 4/2015 | | |

OTHER PUBLICATIONS

JP648519 Text (Year: 2019).*
International Search Report (PCT/ISA/210) issued in PCT Application No. PCT/EP2021/065284 dated Sep. 1, 2021 with English translation (five (5) pages).
German-language Written Opinion (PCT/ISA/237) issued in PCT Application No. PCT/EP2021/065284 dated Sep. 1, 2021 (seven (7) pages).
German-language Office Action issued in German Application No. 10 2020 117 989.9 dated Mar. 5, 2021 (three (3) pages).

* cited by examiner

SECURING ASSEMBLY FOR AN INTERCEPTION ELEMENT ON A VEHICLE PILLAR OF A MOTOR VEHICLE BODY, AND MOTOR VEHICLE

BACKGROUND AND SUMMARY OF THE INVENTION

The invention relates to a fastening arrangement for fastening an interception element to a vehicle pillar of a motor vehicle body, and to a motor vehicle.

DE 10 2013 224 056 A1 discloses a vehicle body for a motor vehicle. The vehicle body has a plurality of spaced-apart vehicle pillars that follow one another in the vehicle longitudinal direction and each at least partially delimit a respective side door opening of the vehicle body.

The object of the present invention is to create a fastening element for fastening an interception element to a vehicle pillar of a motor vehicle body, and a motor vehicle, in particular a passenger car, such that a particularly advantageous accident behavior can be realized.

This object is achieved by a fastening arrangement and by a motor vehicle according to the claimed invention.

A first aspect of the invention relates to a fastening arrangement for fastening an interception element to a vehicle pillar of a body, also referred to as a motor vehicle body, for a motor vehicle, in particular for a passenger car. Preferably, the body is a self-supporting body, wherein the body is also referred to as a body in white or bodyshell. In the fastening arrangement, the interception element, formed preferably from a metal material, in particular from a steel, is fastened to the vehicle pillar. Furthermore, the interception element protrudes outwardly from the vehicle pillar in a vehicle transverse direction, with the result that an upward movement, in a vehicle vertical direction along the vehicle pillar, of an accident-causing obstacle striking the vehicle pillar inwardly in the vehicle transverse direction is at least able to be limited by way of the interception element. In other words, in particular during a side impact, an accident-causing obstacle, for example a barrier or a test body or a passenger car, can strike the vehicle pillar, preferably in the form of a B-pillar, inwardly in the vehicle transverse direction. As a result, the vehicle pillar can yield inwardly in the vehicle transverse direction, whereupon, if appropriate countermeasures are not taken, the accident-causing obstacle can move upwardly in the vehicle vertical direction, or in a vertical direction, along the vehicle pillar, and can thus carry out an upward vertical movement. Such an excessive upward vertical movement of the accident-causing obstacle can now be avoided by way of the interception element, since the interception element catches or intercepts the accident-causing obstacle and at least limits its upward vertical movement or avoids such an excessive upward movement of the accident-causing obstacle in the vehicle vertical direction along the vehicle pillar. As a result, it is possible to avoid any excessively pronounced vertical displacement, resulting from the side impact, of a side door relative to the vehicle pillar. Similarly, excessive intrusion in the region of the side door and thus excessive loads on occupants of the motor vehicle can be avoided, and so a particularly advantageous accident behavior can be realized by the interception element and the occupants can be protected particularly well.

For example, the vehicle pillar delimits at least one side door opening of the body, in particular toward the front in the vehicle longitudinal direction or toward the rear in the vehicle longitudinal direction. In this case, the door opening is assigned the abovementioned side door, in particular in the completely produced state of the motor vehicle. In other words, for example the side door is held movably, in particular pivotably, on the body in the completely produced state of the motor vehicle. The side door, also referred to simply as a door, can, for example, be moved, in particular pivoted, relative to the body between a closed position closing at least a portion of the door opening and at least one open position, opening up the portion.

In order to keep the side door in the closed position, a door lock, also referred to simply as a lock, is provided for example. The door lock has for example a striker, which is fastened, for example, in the completely produced state of the motor vehicle, to the body, in particular to a vehicle pillar. Since, by way of the interception element, an excessive upward movement of the accident-causing obstacle in the vehicle vertical direction along the vehicle pillar and, as a result, an excessive vertical displacement of the side door relative to the vehicle pillar can be avoided, excessive load on the striker can also be avoided. As a result, it is possible to avoid a situation in which the striker detaches from the body as a result of an accident, and so the side door advantageously remains closed. Furthermore, it is possible to ensure that the side door can be opened again with a sufficiently low opening force after the side impact.

Since, by way of the interception element, an excessive upward movement, in the vehicle vertical direction along the vehicle pillar, of the accident-causing obstacle can be avoided, it is also possible to avoid an associated, excessive load, in particular bending load, on the vehicle pillar, and so intrusions can be kept particularly small. Through avoidance of the excessive vertical movement of the accident-causing obstacle, an excessive rise of a lever arm between the accident-causing obstacle and a side sill of the body, to the side sill of which the vehicle pillar is attached, can be avoided. As a result, excessive deformations of the vehicle pillar and thus excessive intrusions can be avoided. For example, the abovementioned door opening, also referred to as a door aperture, is completely delimited downwardly in the vehicle vertical direction by the mentioned side sill.

In order for it to be possible intercept the accident-causing obstacle particularly effectively and early by way of the interception element, in an advantageous configuration of the invention, the interception element is fastened to an outer side, facing toward the outside in the vehicle transverse direction, of the vehicle pillar.

It has been found to be particularly advantageous here when the outer side is the outermost side, in the vehicle transverse direction, of the vehicle pillar. As a result, it is possible for example for the accident-causing obstacle, in the event of a side impact, to interact directly, or only via the side door, with the interception element, in particular form-fittingly, with the result that an excessive rise of the accident-causing obstacle, that is to say an excessive upward movement of the accident-causing obstacle in the vehicle vertical direction along the vehicle pillar can be reliably avoided.

In order to realize a particularly advantageous accident behavior, in a further configuration of the invention, the outer side is arranged, in the completely produced state of the vehicle pillar, without an overlap with all of the remaining vehicle pillar. This should be understood as meaning that the interception element is not for instance an element that is arranged in the vehicle pillar or in a hollow cross section of the vehicle pillar and is intended for example to stiffen or reinforce the vehicle pillar, but rather the interception element is arranged, in particular completely, outside the vehicle pillar and on the outer side thereof, and is not covered toward the outside in the vehicle transverse direction by the vehicle pillar, that is to say by any component of the vehicle pillar. As a result, the interception element can catch or intercept the accident-causing obstacle particularly early and particularly effectively and prevent an excessive upward movement in the vehicle vertical direction along the vehicle pillar.

In order for it to be possible to realize particularly high stability or stiffness of the interception element per se, and as a result for it to be possible to avoid an excessive vertical movement of the accident-causing obstacle, in a further embodiment of the invention, the interception element is a profiled component which, considered on its own, that is to say per se, has an open or closed hollow cross section.

For example, the interception element is formed from a metal sheet, in particular from a steel sheet. Alternatively or additionally, the interception element can be in the form of a bent part, in particular of a sheet-metal bent part, and/or of a folded part. Furthermore, it is conceivable for the interception element to be in the form of an extruded profile.

In a further, particularly advantageous embodiment of the invention, the profiled component has the at least one, considered on its own, open hollow cross section, which is closed by the vehicle pillar and as a result is completed to form a closed hollow cross section. In other words, the hollow cross section of the profiled component is, for example, open per se toward the vehicle pillar, that is to say on a side that faces the vehicle pillar, and is closed, in particular completely, on that side by the vehicle pillar, with the result that the hollow cross section, which is open when the interception element is considered on its own, is completed to form a closed hollow cross section, which is delimited partially, in particular mostly, by the interception element and partially by the vehicle pillar. As a result, particularly high stability and stiffness of the interception element can be created in a cost-effective and space-saving manner.

In particular, the interception element is a component that is formed separately from the vehicle pillar and thus is provided in addition to the vehicle pillar and which is fastened to the vehicle pillar, and therefore is connected to the vehicle pillar. For example, the interception element is connected to the vehicle pillar, in particular to the outer side, by a material bond. In particular, the interception element can be adhesively bonded and/or welded to the vehicle pillar, in particular to the outer side.

A further embodiment is characterized in that the profiled component, considered on its own, that is to say per se, has at least one second, open or closed hollow cross section. The information given above and below in relation to the first hollow cross section can be readily transferred to the second hollow cross section, too, and vice versa. In this case, the second hollow cross section is separated from the first hollow cross section, or partitioned off or subdivided, by, in particular exactly or at least, one wall, formed preferably integrally, of the profiled component. Furthermore, the second hollow cross section adjoins the first hollow cross section toward the front or rear in the vehicle longitudinal direction. This means that the hollow cross sections are arranged preferably successively in the vehicle longitudinal direction.

Tests have shown that it is possible in principle for the hollow cross sections to be able to be arranged successively in the vehicle vertical direction. However, it has been found that when the hollow cross sections are arranged successively in the vehicle longitudinal direction, particularly high stiffness, in particular particularly high bending stiffness, of the interception element can be created, and so a particularly high opposing force can be set against the accident-causing obstacle, or against a force that acts on the interception element and results for example from the fact that the accident-causing obstacle impacts the vehicle pillar toward the outside in the vehicle transverse direction, such that an excessive upward movement of the accident-causing obstacle in the vehicle vertical direction along the vehicle pillar can be reliably avoided. Furthermore, an unfavorable or excessive load on connecting elements, by way of which the interception element is connected to the vehicle pillar, in particular to the outer side, can be avoided. The connecting element is for example a weld seam, in particular a spot weld seam, for example a spot weld, and so for example the interception element is welded and thus connected to the vehicle pillar with formation of the weld seam, in particular of the spot weld. In particular, it is possible for example when the hollow cross sections are arranged successively in the vehicle longitudinal direction to avoid excessive tensile stress on the weld seam or primarily to realize shear stress on the weld seam, such that excessively early detachment of the interception element from the vehicle pillar can be avoided. As a result, the accident-causing obstacle can be prevented particularly effectively from moving excessively vertically.

A size, that is to say external dimension and a geometry of the interception element in the form preferably of a profile or profiled element can be selected or configured, in particular depending on the load. Furthermore, different shapes of the interception element are conceivable. Provision may be made for the hollow cross sections to be identical, in particular with regard to their shape and/or size. Furthermore, it is conceivable for the hollow cross sections to differ from one another in particular in terms of their respective shapes and/or sizes.

In order, finally, for it to be possible to particularly effectively avoid an excessive vertical movement of the accident-causing obstacle, in a further configuration of the invention, with regard to the entire height, extending in the vehicle vertical direction, of the vehicle pillar, the interception element is arranged in the lower half, in particular in the lower third, of the vehicle pillar in the vehicle vertical direction. As a result, the accident-causing obstacle can be intercepted particularly early and secured against an excessive vertical movement.

The interception element is particularly advantageous for a vehicle pillar or for a body in which, although the vehicle pillar is attached to the mentioned side sill at the bottom, that is to say downwardly in the vehicle vertical direction, it is not attached at the top, that is to say upwardly in the vehicle vertical direction, to a roof, but has a substantially free end upwardly in the vehicle vertical direction. This is the case in particular in an open passenger car, for example a roadster or convertible, wherein the vehicle pillar can extend upwardly for example from the side sill in the vehicle vertical direction only as far as a beltline. Of course, the interception element can, however, also be used for a body of a closed passenger car, in which the vehicle pillar is attached downwardly to a side sill and on the other side or at the other end, and thus upwardly in the vehicle vertical direction, to a roof of the body.

A second aspect of the invention relates to a motor vehicle, preferably in the form of a passenger car, which has at least one fastening arrangement according to the invention according to the first aspect of the invention. Advantages and advantageous configurations of the first aspect of the invention should be considered to be advantages and advantageous configurations of the second aspect of the invention and vice versa.

It has been found to be particularly advantageous when the abovementioned side door is held on the body and is movable, in particular pivotable between the closed position and the open position relative to the body. It has been found to be particularly advantageous in this case when, in the closed position, the interception element is covered toward the outside in the vehicle transverse direction by nothing other, that is to say by no other component of the motor vehicle than the side door. As a result, in the event of the above-described side impact, the accident-causing obstacle can interact with the interception element directly or can interact, in particular form-fittingly, with the interception element only via the side door and not for instance via a further component, with the result that an excessive vertical movement of the accident-causing obstacle can be avoided reliably and effectively.

Details of the invention will become apparent below from the description of the figures.

DETAILED DESCRIPTION OF THE DRAWINGS

In the figures, identical or functionally identical elements are provided with the same reference signs.

Figure 1:
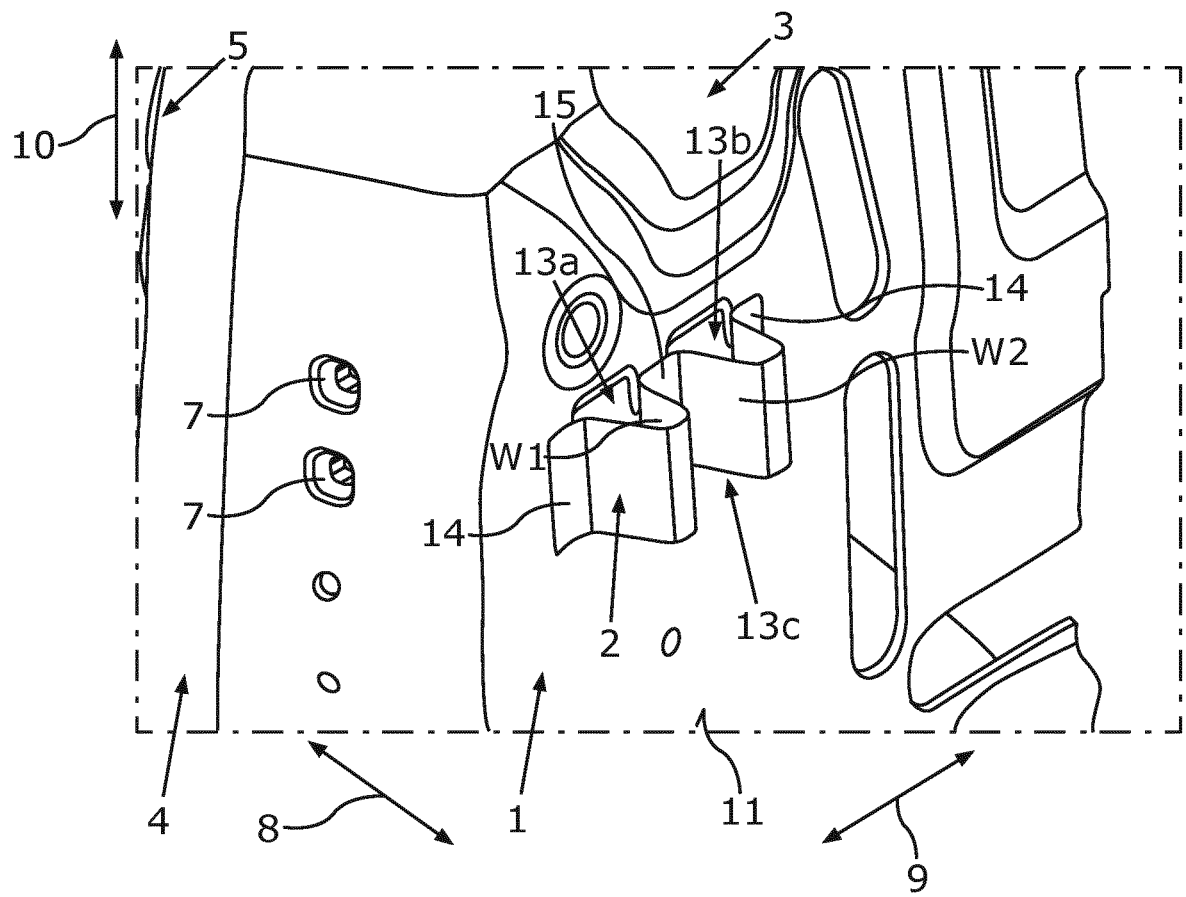
FIG. 1 shows a schematic perspective detail view of a fastening arrangement according to the invention for fastening an interception element to a vehicle pillar of a body for a motor vehicle according to a first embodiment.

FIG. 1 shows a schematic perspective detail view of a first embodiment of a fastening arrangement 1 for fastening an interception element 2 to a vehicle pillar, in the form of a B-pillar 3 in the first embodiment, of a body 4, also referred to as a motor vehicle body, for a motor vehicle, in particular for a passenger car. The body 4 is in the form of a self-supporting body and delimits an interior, also referred to as a passenger compartment, of the motor vehicle, in the interior of which people, for example the driver of the motor vehicle, can be accommodated. The body 4 has side door openings, of which one side door opening, denoted 5 in FIG. 1, can be seen in part. The door opening 5 is delimited for example in the vehicle longitudinal direction, in particular toward the rear, at least partially, in particular at least mostly or entirely, by the B-pillar 3. Downwardly in the vehicle vertical direction, the door opening 5 is delimited by a side sill 6, part of which can be seen in FIG. 5, of the body 4, wherein a lower end, in the vehicle vertical direction, of the B-pillar 3 is attached to the side sill 6. An upper end, in the vehicle vertical direction, of the B-pillar 3 can be attached to an, in particular fixed, roof of the body 4, in particular when the motor vehicle is in the form of a closed motor vehicle, that is to say of a closed passenger car. Alternatively, it is conceivable for the upper end, in the vehicle vertical direction, of the B-pillar 3 to be free per se, that is to say considered on its own, in particular in the completely produced state of the body 4 or of the motor vehicle as a whole. This is the case in particular when the motor vehicle is in the form of an open motor vehicle, that is to say of an open passenger car, which has for example a top that is movable or displaceable relative to the body 4. The top may be displaced for example relative to the body 4 between a closed position of the top and an open position of the top. In the closed position of the top, the interior is covered and thus delimited at least partially, in particular at least mostly or entirely, by the closed top upwardly in the vehicle vertical direction. However, in the open position of the top, the top upwardly opens up the interior in the vehicle vertical direction, such that the interior is not covered by the open top upwardly in the vehicle vertical direction in the open position of the top.

In the completely produced state of the motor vehicle, the side door opening 5 is assigned a side door, also referred to simply as a door, which is held movably, in particular pivotably, on the body 4. In particular, the side door is held movably, in particular pivotably, on a further vehicle pillar, in the form of an A-pillar, of the body 4, wherein the A-pillar and the B-pillar 3 are arranged successively and in a manner spaced apart from one another in the vehicle longitudinal direction. In this case, the door opening 5 is delimited at least partially, in particular at least mostly or entirely, by the A-pillar toward the front in the vehicle longitudinal direction. In this case, the A-pillar is, for example, likewise attached to the side sill 6 at its lower end in the vehicle vertical direction. The side door can be moved, in particular pivoted, between a closed position and at least one open position relative to the body 4. In the closed position, the side door covers or closes at least a portion of the door opening 5. In the open position, the side door opens up the portion of the door opening such that, in the open position of the side door, a person can enter the interior or exit the interior via the opened up portion, that is to say through the portion.

In order for it to be possible to fix the side door for example in the closed position relative to the body 4 and thus to secure it against undesired opening, that is to say against undesired movement from the closed position into the open position, a door lock, which is not shown in the figures and is also referred to simply as a lock, is provided. The door lock comprises for example a striker, which is fastened to the B-pillar 3 in the completely produced state of the motor vehicle. To this end, the B-pillar 3 has for example openings 7, by way of which the striker is fastened or able to be fastened to the vehicle pillar (B-pillar 3) and thus to the body 4. The door lock furthermore comprises for example a rotary latch that is held on the side door, is able to be moved along with the side door and, as a result of the side door being closed, that is to say as a result of the side door being moved from the open position into the closed position, is able to interact with the striker, with the result that the side door is retained, in particular reversibly, in the closed position by way of the door lock.

Figure 3:
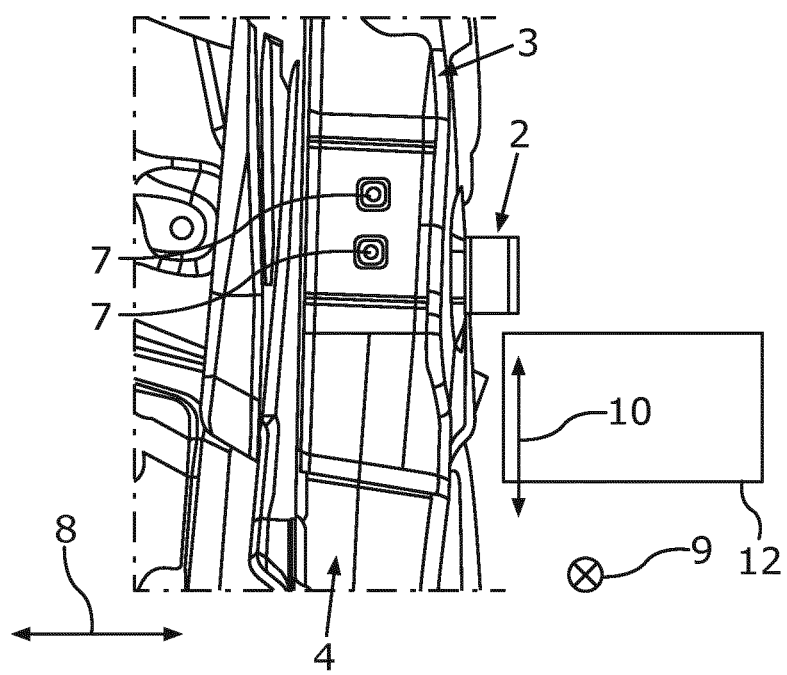
FIG. 3 shows a schematic side view of the fastening arrangement according to the first embodiment.

In the fastening arrangement 1, the interception element 2 is fastened to the B-pillar 3. This can be understood as meaning in particular that the interception element 2 is in the form of a component that is separate from the B-pillar 3 and is thus provided in addition to the B-pillar 3, and which is connected to the B-pillar 3 and as a result fastened, in particular secured to the B-pillar 3. In this case, the interception element 2 protrudes toward the outside in the vehicle transverse direction from the B-pillar 3. The vehicle transverse direction is illustrated in FIG. 1 by a double arrow 8. Furthermore, the vehicle longitudinal direction is illustrated by a double arrow 9 in FIG. 1 and the vehicle vertical direction is illustrated by a double arrow 10 in FIG. 1. Since the interception element 2 is fastened to the B-pillar 3 and protrudes toward the outside in the vehicle vertical direction from the B-pillar 3, in particular from the outer side 11 thereof, an upward movement, in the vehicle vertical direction along the B-pillar 3, of an accident-causing obstacle 12 that strikes the B-pillar 3 from outside to inside in the vehicle transverse direction and is illustrated particularly schematically in FIG. 3 is able to be at least limited by way of the interception element 2.

It is particularly apparent from FIGS. 1 and 3 to 6 that the interception element 2 is fastened to an outer side 11, facing toward the outside in the vehicle transverse direction, of the B-pillar 3, wherein the outer side 11 is the outermost side, in the vehicle transverse direction, of the B-pillar 3. In this case, the outer side 11 is arranged without an overlap with all of the remaining B-pillar 3 in the completely produced state of the B-pillar 3. Furthermore, provision is preferably made for the interception element 2, in the completely produced state of the motor vehicle and in the closed position of the side door, to be covered toward the outside in the vehicle transverse direction by no other element or by no other component of the motor vehicle apart from by the side door. As a result, the accident-causing obstacle 12 can, for example when it strikes the B-pillar 3 from outside to inside in the vehicle transverse direction during a side impact, interact directly with the interception element 2 or only interact with the interception element 2 via the side door. Interaction should be understood as meaning in particular that the interception element 2 embeds itself in the accident-causing obstacle 12 directly or only via the side door during the side impact. As a result, excessive rising of the accident-causing obstacle 12, that is to say an excessive upward movement of the accident-causing obstacle 12 in the vehicle vertical direction along the B-pillar 3 is avoided, with the result that a particularly advantageous accident behavior of the motor vehicle can be ensured.

Figure 2:
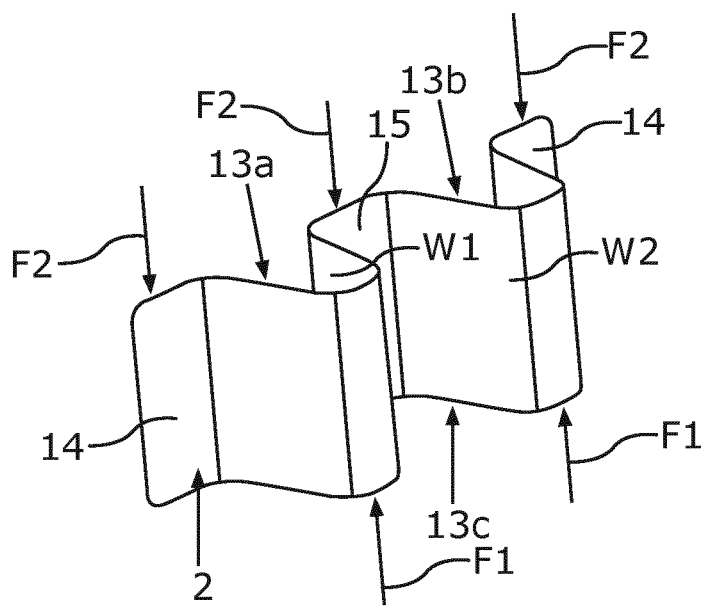
FIG. 2 shows a schematic perspective view of the interception element according to the first embodiment.

It is particularly apparent from FIG. 2 that the interception element 2 is a profiled component which, considered on its own, has at least or exactly two hollow cross sections 13a, b. This means that the hollow cross sections 13a, b, when the profiled component is considered on its own, are open. In the first embodiment, the hollow cross sections 13a, b are open toward the inside in the vehicle transverse direction and thus toward the B-pillar 3 and are completed by the B-pillar 3 to form closed hollow cross sections. Furthermore, in the first embodiment, the hollow cross sections 13a, b are arranged successively or one after another in the vehicle longitudinal direction. In the first embodiment, the profiled component has a third hollow cross section 13c, which is open when the interception element 2 is considered on its own. In this case, the hollow cross section 13c is arranged between the hollow cross sections 13a, b in the vehicle longitudinal direction, wherein the hollow cross section 13c is closed toward the B-pillar 3 and is open toward the outside in the vehicle transverse direction when the interception element 2 is considered on its own. Toward the hollow cross sections 13a, b, the hollow cross section 13c is delimited by respective walls W1 and W2 that are formed preferably integrally, such that the hollow cross sections 13a-c, in particular along the vehicle longitudinal direction, are separated from one another by the respective walls W1 and W2.

In FIG. 2, an accident-related force, which acts on the interception element 2 for example in the course of the second impact and originates for example from the accident-causing obstacle 12, is illustrated by the arrows F1. In other words, the force F1 results for example from the fact that the accident-causing obstacle 12 strikes the B-pillar 3 from outside to inside in the vehicle transverse direction and in the process is caught or intercepted by way of the interception element 2 and prevented from moving upward excessively in the vehicle vertical direction along the B-pillar 3. Since the accident-causing obstacle 12 is for example a passenger car or a test body and is also referred to as an impactor, the force illustrated by the arrows F1 is also referred to for example as an impactor force.

Furthermore, in FIG. 2, arrows F2 illustrate an opposing force which is for example a reaction force and results from the force illustrated by the arrows F1. The opposing force thus opposes the impactor force. In other words, it is possible for example for the interception element 2 to set the opposing force against the impactor force and as a result to avoid an excessive upward movement of the accident-causing obstacle 12 in the vehicle vertical direction along the B-pillar 3. In particular, in the first embodiment, particularly high stiffness, in particular bending stiffness, of the interception element 2 can be realized.

Furthermore, it is apparent from FIG. 2 that the interception element 2, formed for example integrally, can have joining flanges 14. Via the joining flanges 14, the interception element 2 is welded for example, in particular by spot welds, to the B-pillar 3, in particular to the outer side 11. The joining flanges 14 each adjoin the hollow cross sections 13a-c on both sides thereof. A wall region 15 of the interception element 2 may be arranged between the hollow cross sections 13a and 13b, wherein for example the walls W1 and W2 are connected together via the wall region 15. In particular, the wall region 15 can be integral with the walls W1 and W2. It is conceivable for the wall region 15 arranged between the joining flanges 14 to be used as a further joining flange, via which the interception element 2 can be connected to the B-pillar 3, in particular to the outer side 11. For example, the interception element 2 is welded, in particular by spot welds, to the B-pillar 3, in particular to the outer side 11, via the wall region 15.

FIG. 3 shows a detail of the fastening arrangement 1 in a side view. It is apparent from FIG. 3 in particular that the interception element 2 is arranged at least approximately at the level of the lower opening 7 in the vehicle vertical direction. In this case, it is in particular alternatively or additionally conceivable for the interception element 2 to be arranged in the lower half of the B-pillar 3 in the vehicle vertical direction with regard to the entire height of the B-pillar 3 in the vehicle vertical direction. As a result, the accident-causing obstacle 12 can be caught or intercepted particularly early.

Figure 4:
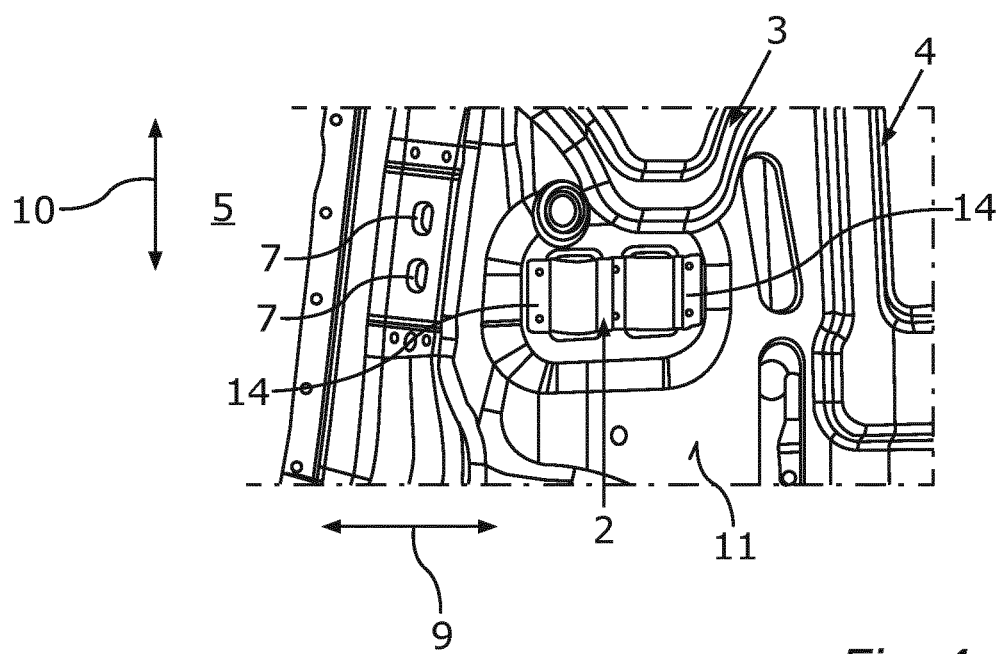
FIG. 4 shows a schematic front view of the fastening arrangement according to the first embodiment.
Figure 5:
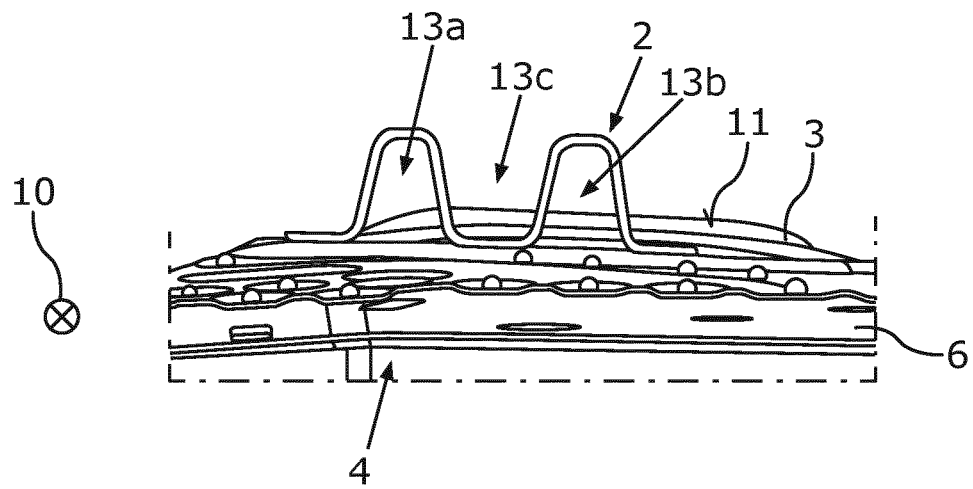
FIG. 5 shows a schematic bottom view of the fastening arrangement according to the first embodiment.

FIG. 4 shows a detail of the fastening arrangement 1 according to the first embodiment in a schematic front view, while FIG. 5 shows the fastening arrangement 1 in a schematic bottom view, that is to say with the viewing direction from the side sill 6. The respective hollow cross sections 13a-c that are open when the interception element 2 is considered on its own are particularly apparent from FIG. 5, while the hollow cross sections 13a, b are closed by the B-pillar 3.

Figure 6:
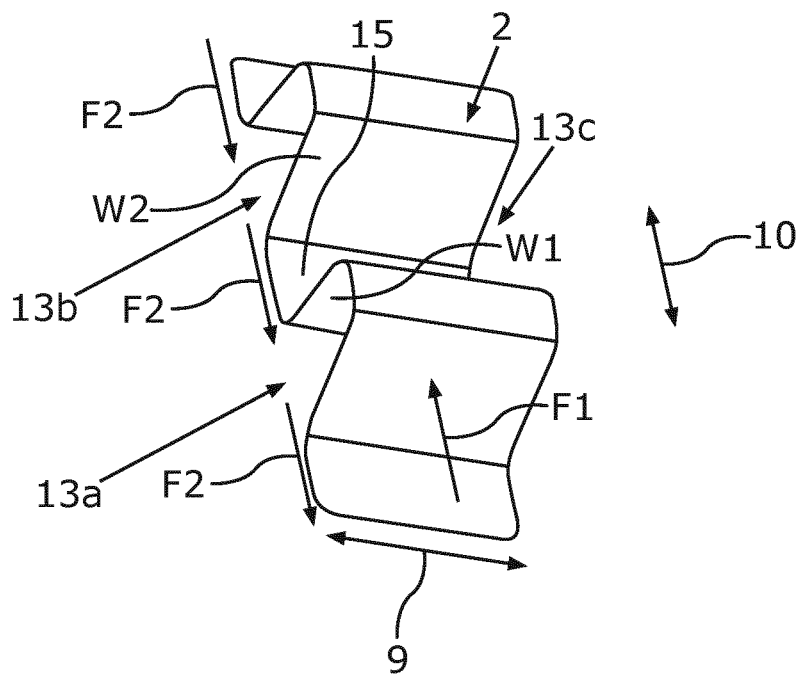
FIG. 6 shows a schematic perspective view of the interception element according to a second embodiment.

Finally, FIG. 6 shows the interception element 2 according to a second embodiment. To all intents and purposes, the interception element 2 according to the second embodiment has an identical structure to the interception element 2 according to the first embodiment. The second embodiment differs from the first embodiment in particular in that, in the second embodiment, the interception element 2 is arranged relative to the B-pillar 3 such that the hollow cross sections 13a-c are not arranged successively for instance in the vehicle longitudinal direction but in the vehicle vertical direction. It has been found that, by way of the first embodiment, greater stiffness, in particular bending stiffness, of the interception element 2 can be created and that, in the first embodiment, by way of the interception element 2 the opposing force opposing the accident-causing obstacle 12 or the impactor force can be greater than in the second embodiment. However, advantageous catching or interception of the accident-causing obstacle 12 can also be realized by the second embodiment.

LIST OF REFERENCE SIGNS

1 Fastening arrangement
2 Interception element
3 B-pillar
4 Body
5 Door opening
6 Side sill
7 Opening
8 Double arrow
9 Double arrow
10 Double arrow
11 Outer side
12 Accident-causing obstacle
13a-c Hollow cross section
14 Joining flange
15 Wall region
F1 Arrow
F2 Arrow
W1 Wall
W2 Wall

The invention claimed is:

1. A fastening arrangement for fastening an interception element to a vehicle pillar of a body for a motor vehicle, wherein:
    the interception element fastened to the vehicle pillar protrudes outwardly from the vehicle pillar in a vehicle transverse direction, with a result that an upward movement, in a vehicle vertical direction along the vehicle pillar, of an accident-causing obstacle striking the vehicle pillar inwardly in the vehicle transverse direction is limitable by way of the interception element,
    the interception element is a profile component which, when viewed alone, has two first hollow cross-sections arranged one after the other in the vehicle vertical direction or in the vehicle longitudinal direction and a third hollow cross-section,
    the third hollow cross-section is arranged in the vehicle vertical direction or in the vehicle longitudinal direction between the first hollow cross-sections and is defined by walls of the profile component, and
    the third hollow cross-section is separated from the first hollow cross sections, is closed towards the vehicle pillar, and is open to an outside in the vehicle transverse direction when the interception element is viewed alone,
    such that the interception element is wave-shaped on an outer side of the interception element facing outwards in the vehicle transverse direction.

2. The fastening arrangement according to claim 1, wherein:
    the interception element is fastened to an outer side, facing toward an outside in the vehicle transverse direction, of the vehicle pillar.

3. The fastening arrangement according to claim 2, wherein:
    the outer side of the vehicle pillar is an outermost side, in the vehicle transverse direction, of the vehicle pillar.

4. The fastening arrangement according to claim 1, wherein:
    with regard to an entire height, extending in the vehicle vertical direction, of the vehicle pillar, the interception element is arranged in a lower half of the vehicle pillar in the vehicle vertical direction.

5. A motor vehicle comprising the fastening arrangement according to claim 1.

6. The motor vehicle according to claim 5, wherein:
    a side door is held on the body and is pivotable between a closed position and at least one open position relative to the body, and
    in the closed position, the interception element is covered toward the outside in the vehicle transverse direction by only the side door.

\* \* \* \* \*